US010460429B1

(12) United States Patent
Pinkus et al.

(10) Patent No.: US 10,460,429 B1
(45) Date of Patent: Oct. 29, 2019

(54) AUTO-RANGING PARAMETRIC SPATIAL FILTERING

(71) Applicant: Government of the United States, as represented by the Secretary of the Air Force, Wright-Patterson AFB, OH (US)

(72) Inventors: Alan R Pinkus, Bellbrook, OH (US); David W Dommett, Beavercreek, OH (US); Allan Pantle, Oxford, OH (US); Jordan M Haggit, Picherington, OH (US)

(73) Assignee: United States of America as represented by the Secretary of the Air Force

( * ) Notice: Subject to any disclaimer, the term of this patent is extended or adjusted under 35 U.S.C. 154(b) by 180 days.

(21) Appl. No.: 15/861,035

(22) Filed: Jan. 3, 2018

(51) Int. Cl.
*G06T 5/20* (2006.01)
*G06T 7/60* (2017.01)

(52) U.S. Cl.
CPC ............... *G06T 5/20* (2013.01); *G06T 7/60* (2013.01); *G06T 2200/24* (2013.01); *G06T 2207/10048* (2013.01); *G06T 2207/20048* (2013.01); *G06T 2207/30212* (2013.01)

(58) Field of Classification Search
CPC .... G06T 5/10; G06T 5/20; G06T 7/50; G06T 7/521; G06T 7/70; G06T 2207/20024; G06T 2207/20048; G06T 2207/20056; G06T 2207/30212

See application file for complete search history.

(56) References Cited

U.S. PATENT DOCUMENTS

2007/0165962 A1* 7/2007 Smirnov et al. ......... G06K 9/40
382/260
2018/0143316 A1* 5/2018 Knight .................... G01S 7/411

OTHER PUBLICATIONS

Neriani et al., Visual Performance-Based Image Enhancement Methodology: An Investigation of Contrast Enhancement Algorithms. Enhanced & Synthetic Vision, Proceedings of SPIE, 2006, Orlando, FL, vol. 6226, 6226-06.
Pomplun, M., Saccadic Selectivity in Complex Visual Search Displays, 2006, Vision Res. 46 (pp. 1886-1900).
(Continued)

*Primary Examiner* — Andrew W Johns
(74) *Attorney, Agent, or Firm* — AFMCLO/JAZ; Jeff Moore

(57) ABSTRACT

A portable image enhancement device comprising an optical image sensor, a rangefinder, a parametric control, a central processing unit (CPU), and a user interface. The sensor receives image data for a target object in a tactical scene. The rangefinder continually measures distance from the device to the target object, which may be in motion relative to each other. The parametric control tunes a parametric variable (e.g., spatial frequency, filter shape, orientation) that the CPU uses, along with the potentially-changing target distance, to create custom spatial filters and apply them to create a filtered scene from the tactical scene. Each spatial filter is of a two-dimensional (2D) Fourier-domain type (e.g., high-pass, low-pass, band-pass, band-stop, orientation). A spatial filter, target distance, and parametric variable combination may be stored as a preset filter for subsequent retrieval and application to a newly-input tactical scene. The user interface displays dynamically-tunable filtered scene(s).

20 Claims, 14 Drawing Sheets

(56) References Cited

OTHER PUBLICATIONS

Pinkus et al., Dynamic Stimulus Enhancement with Gabor-Based Filtered Images, 2008, Proceedings of SPIE, Orlando, FL, vol. 6968-63.

Neriani et al., An Investigation of Image Fusion Algorithms Using a Visual Performance-Based Image Evaluation Methodology, 2009, Wright-Patterson AFB, OH: Air Force Research Laboratory.

Pinkus et al., Object Recognition Methodology for the Assessment of Multi-Spectral Fusion Algorithms: Phase I. (AFRL-RH-WP-TR-2010-0075), 2010, Wright-Patterson AFB, OH: Air Force Research Laboratory.

Pinkus et al., Search Performance with Discrete-Cell Stimulus Arrays: Filtered Naturalistic Images and Probabilistic Markers, 2013, Psychological Research, vol. 77 (pp. 277-302).

Pinkus et al., Effects of the Experimental Manipulation of Fourier Components of Naturalistic Imagery on Search Performance and Eye-Tracking Behavior, 2015, Proc SPIE, vol. 9474-34 S7.

Toet et al., The TRICLOBS Dynamic Multi-Band Image Data Set for the Development and Evaluation of Image Fusion Methods, Aug. 10, 2016, Public Library of Science (PLOS ONE), <http://dx.doi.org/10.6084/m9.figshare.3206887>.

Dosher BA, Lu Z-L. (2000). Noise exclusion in spatial attention. Psychological Science, 11:139. doi:10.1111/1467-9280.00229.

Smith AT, Singh KD, Greenlee MW. (2000). Attentional suppression of activity in the human visual cortex. Neuroreport, 11(2):271-277.

* cited by examiner

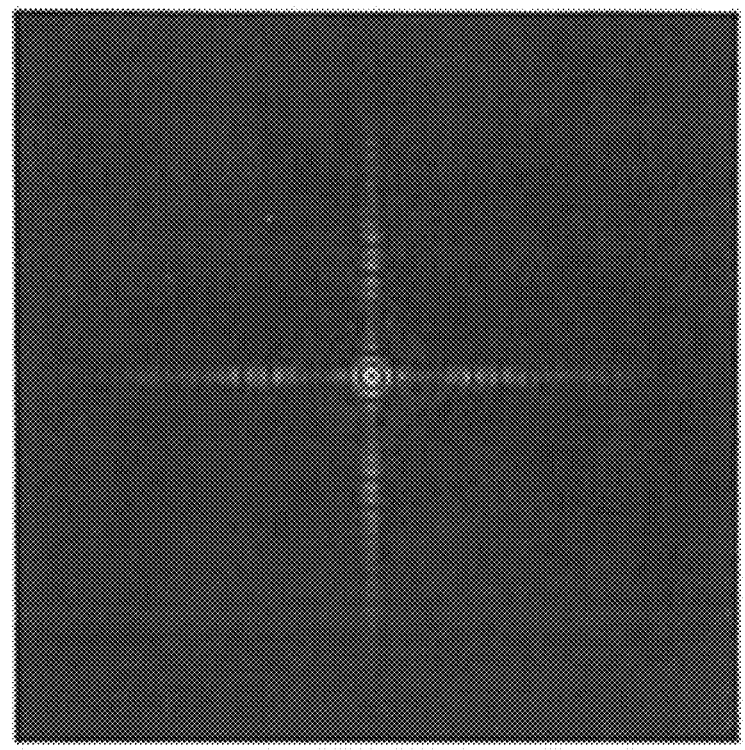
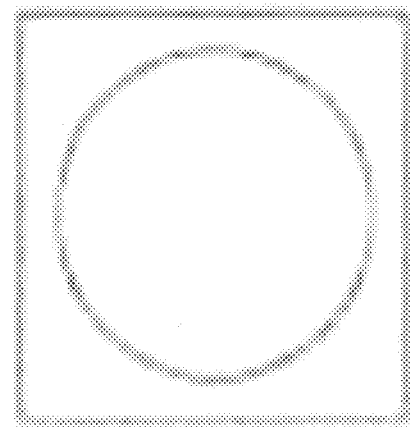
FIG. 10

AUTO-RANGING PARAMETRIC SPATIAL FILTERING

GOVERNMENT INTEREST

The invention described herein may be manufactured and used by or for the Government of the United States for all governmental purposes without the payment of any royalty.

FIELD OF THE INVENTION

The present invention relates to visual search aids. More specifically, this invention pertains to automated devices, systems, and methods for identifying target objects of interest in a digital image representation of a tactical scene.

BACKGROUND OF THE INVENTION

Visual search refers to the challenge of finding specific, relevant objects (also defined as targets) in a tactical scene. Imagery is commonly used as a visual search aid in tactical situations, such as military actions and security operations. For example, an image of a scene may be produced to analyze it and extract from it discernable features of an object of interest. When imaging tactical scenes in varying conditions (e.g., noise, clutter, dynamic range, and/or dynamic motion), perception of subtle anomalies and irregularities in such imagery can be difficult. This is especially true in imaging situations in which such conditions cannot be controlled in terms of signal to background, signal to noise, and signal to clutter.

Computer-aided techniques may be used to improve the ability to perceive a target in a scene and/or accelerate detection and/or identification of such a target, either with or without a man-in-the-loop. However, vast amounts of available imagery data can make it difficult to quickly and accurately find and extract relevant and/or actionable information in the field, and particularly when target detection results are required by an observer in near real-time.

Image enhancement techniques may be used to facilitate visual interpretation and understanding of digital imagery. Although a particular image may not be optimized for visual interpretation, an advantage of digital imagery is that digital pixel values in an image may be manipulated (i.e., corrected) to highlight various features present in the image that may be visually obscured. Because of the large variations in the spatial characteristics provided by a diverse range of tactical scenes (e.g., forests, deserts, grassy fields), no generic correction can optimally account for and display all targets in any given scene. Rather, for any particular image and/or tactical application, a custom correction may be necessary to detect a target. In some instances, a correction can be provided by one or more filters that when applied to a digital image can enhance or suppress various features contained therein. A filter represents a class of digital image correction functions that can help declutter complex visual scenes and speed the identification of targets embedded in the clutter.

Frequency filters are one class of filter that process an image in the Fourier domain. Frequency filters selectively filter the spatial frequencies in a particular image. The spatial frequencies of an image vary according to the content the image contains. An image containing small details and sharp edges, for example, contains higher spatial frequencies than images having content with lower resolution. A scene's spatial content interacts with the human visual system's own modulation transfer function (MTF). The inverse MTF is referred to as the contrast threshold function (CTF). When applying a frequency filter to an image, the image—which in its visually normal state is referred to as being in the spatial domain—is Fourier transformed, multiplied with a filter function in a pixel-by-pixel fashion, and then re-transformed into the spatial domain using an inverse Fourier Transform. All frequency filters can in theory be implemented in the spatial domain and, if there exists a simple kernel for the desired filter effect, filtering in the spatial domain is computationally economical to perform. Frequency filtering is more appropriate in those instances where a simple kernel cannot be found in the spatial domain.

In addition, an image can be filtered by orientation to aid in target detection (e.g., frequency filters may be extended to two dimensions to create filters which are selective for orientation). Orientation filtering may exploit the tendency of natural and man-made scenes to be characterized by vertical and horizontal content, which may contribute to the 'oblique effect' in the human visual system (i.e., greater sensitivity to the cardinal orientations, and a greater number of neurons tuned to these orientations).

The selection of the filter function(s) applied to an input image determines their effects. Three types of frequency filters, for example, can be applied to enhance an image: low pass, high pass, and band-pass. A low-pass filter attenuates high frequencies and maintains low frequencies unchanged. The result in the spatial domain is equivalent to that of a smoothing filter, as the blocked high frequencies correspond to sharp intensity changes (i.e., fine-scale details and noise in the spatial domain image). A high-pass filter provides edge enhancement or edge detection in the spatial domain because, as noted above, an image having edges contains many high frequencies. When a high-pass filter is applied, areas of rather constant gray level resolution, which consist of mainly low frequencies, are suppressed. A band-pass filter attenuates very low and very high frequencies but retains a middle range band of frequencies. Band-pass filtering can be used to enhance edges (suppressing low frequencies) while reducing the noise at the same time (attenuating high frequencies).

As described above, selectively filtering imagery has been shown to speed and guide human visual search of targets (a problem space referred to herein as tactical cuing). The following references, which are not admitted to be prior art with respect to the present invention by inclusion in this section, are incorporated by reference for background on the theoretical basis of selective filtering, the photos, filters, and study test stimuli illustrated in FIGS. 1-7:

(1) Pinkus, A. R., Garrett, J. S., Paul, T. M., & Pantle, A. J. (2015). Effects of the experimental manipulation of Fourier components of naturalistic imagery on search performance and eye-tracking behavior. *Proc SPIE*, Vol. 9474-34 S7;

(2) Pinkus, A. R., Poteet, M. J., & Pantle, A. J. (2008). Dynamic stimulus enhancement with Gabor-based filtered images. *Proc SPIE*, Orlando, Fla., Vol. 6968-63;

(3) Pinkus, A. R., Poteet, M. J., & Pantle, A. J. (2013). Search performance with discrete-cell stimulus arrays: filtered naturalistic images and probabilistic markers. *Psychological Research*, Vol. 77, 277-302;

(4) Dosher B A, Lu Z-L. (2000). Noise exclusion in spatial attention. *Psychological Science*, 11:139. doi: 10.1111/1467-9280.00229; and (5) Smith A T, Singh K D, Greenlee M W. (2000). Attentional suppression of activity in the human visual cortex. *Neuroreport*, 11(2):271-277.

FIG. 1 shows a pre-filtered source image 100 depicting an exemplary aerial view of the Royal Dutch Army training village in Reek, The Netherlands. FIG. 2 depicts the different filters 200 constructed in the Fourier-domain as applied to modify the FIG. 1 source image 100. Illustrated are four filters: (1) narrow orientation 205, (2) broad orientation 215, (3) middle band-pass 225, (4) notch low- and high-pass 235. As illustrated, white areas pass spatial frequencies and black areas block spatial frequencies.

The narrow orientation filter 205 passes all spatial frequencies with orientations between 0-12.5 degrees. The broad orientation filter 215 passes all spatial frequencies with orientations between 0-67 degrees. The middle band-pass filter 225 passes only spatial frequencies from 3-8 cycles per segment (all orientations). The notch filter 235 blocks spatial frequencies 3-8 cycles per segment (all orientations).

FIG. 3 illustrates exemplary visual effects of applying the different filters of 200 of FIG. 2 to exemplary image 302 (Note: This smaller area 302 of source image 100 is selected and enlarged for clarity of illustration herein). Various filter combinations 305, 315, 325, 335 are shown as applied to (i.e., convolved with) segmented areas (patches) of the source image 302. As mentioned the theoretical references listed above, selectively filtering imagery has been shown to speed and guide human visual search of targets. Selective attention in visual search involves both stimulus (referred to herein as "target") enhancement and suppression of competing (referred to herein as "distractor") information. Applying appropriately constructed filters, as described herein, to a digital image can help declutter complex visual scenes and speed the identification of obscured targets embedded in clutter.

The exemplary target cuing display 400 of FIG. 4 shows the filtered image 302 anatomically segmented into seven (7) rows and seven (7) columns defining forty-nine (49) patches. As illustrated in FIG. 4, a filter of band-pass type 325 (from FIG. 3) may be applied to create each of the 49 patches, although other types of filters (including orientation-narrow type 305, orientation-broad type 315, and notch: low and high pass type 335) may be applied to produce alternative enhancement effects. For purposes of the illustrated example, a centrally-located patch 405 may be assumed to represent the search target and all the other (48) patches disposed about the search target 405 may be assumed to serve as distractors (or distractor segments). When the target 405 and distractor patches (clutter) are altered using the same filter (as shown, a filter of band-pass type 325), the visual search times and number of fixations increase. The tracking lines 410, 420, 430 in FIG. 4 illustrate exemplary eye-scanning behavior of the source image 302 with the same filter applied to both the target 405 and distractor segments. As shown, numerous fixations (i.e., direction-changing points along the search paths 410, 420, 430, defined herein as "hits") are carried out to find the target pattern's location 402 within the target patch 405. Similarly, the exemplary target cuing display 500 of FIG. 5 shows heat mapping of the source image 302 with the same filter (as illustrated, a filter of band-pass type 325) applied to both target 505 and distractor segments. Similar to FIG. 4, multiple positive heat readings present as object "hits" in distractor segments may be expected to result in longer tracking times (e.g., multiple fixations) to find the target pattern's location 502 within the target patch 505.

Referring now to FIG. 6, and referring again to FIG. 3, a target area of an input image may be altered with one type of filter and distractor patches (clutter) may be altered using a different filter, advantageously resulting in fewer fixations and shorter search times to find a target pattern. For example, and without limitation, in the exemplary target cuing display 600 the centrally-located patch 605 in the filtered image 302 may define the search target whereas all the other (48) patches may serve as distractors (similar to prior art FIG. 4). The tracking lines 610, 620, 630 in FIG. 6 illustrate exemplary eye-scanning behavior of the source image 302 in which one filter (e.g., vertical line enhancement) may be applied to half of the segments including the target 605 and a different filter (e.g., horizontal line enhancement) may be applied to the other half of the segments (all distractors). As shown, typical eye-scanning behavior may exhibit fewer fixations carried out to find the target pattern's location 602 compared to the fixations experienced to find the target pattern's location 402 using the single-filter approach from prior art FIG. 4. Similarly, the exemplary target cuing display 700 of FIG. 7 shows heat mapping of the source image 302 in which one filter may be applied to half of the segments including the target 505 and a different filter may be applied to the other half of the segments (all distractors). As shown, fewer object "hits" in distractor segments may result in shorter times to find the target pattern's location 702 within the target segment 705 than were experienced using the single-filter approach from prior art FIG. 5.

A need exists for a target cuing solution that tailors the application of filters to both the target potential areas and the non-target areas of a tactical scene, such that fewer fixations and shorter search times to find a target pattern may be realized.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an image enhancement device, and associated systems and methods, comprising an optical image sensor, a rangefinder, a central processing unit (CPU), and a user interface. The optical image sensor receives image data for a tactical scene within which a target object of potential interest may be present. The rangefinder is used to measure a distance from the device to the target object (i.e., target distance), respective reference points for which are variable should the device, the target object, or both be in motion relative to each other. The CPU retrieves from a non-transitory computer-readable storage medium computer instructions that the CPU executes to create a filtered scene comprising content from the tactical scene that includes the target object.

The image enhancement device, and associated systems and methods, also comprises at least one filter selection control configured to transmit a parametric variable to the CPU. The computer instructions further comprise spatial filters that the CPU retrieves and executes using the target distance and the parametric variable, to create a corrected image defining a filtered scene. The user interface displays the filtered scene for use by an observer.

Each of the spatial filters is of a two-dimensional (2D) Fourier-domain type (e.g., high-pass, low-pass, band-pass, band-stop, orientation). The parametric variable used by the CPU in spatial filter calculation is of a type that may include a spatial frequency variable, a filter shape variable, an orientation variable, and combinations thereof. The computer instructions are further configured to store a spatial filter, target distance, and parametric variable combination as a preset filter selection that the CPU may retrieve and recalculate for a newly-input tactical scene.

The rangefinder is further configured to continually measure changing distances between the device and a target object(s) that are in motion relative to each other. The distance information may be used to mathematically adjust, in the Fourier domain, filtered spatial content to remain constant at different distances. A given object that is close may have lower overall spatial content than when it is farther away. The ranging information may be used to adjust the spatial filter so that it may isolate the same features/objects, but within the constraints that frequencies are limited by the observer's modulation transfer function (contrast sensitivity), the number of sensor elements (sensels), and the display's pixel resolution. The Fourier transform may be calculated over the entire frame of the display pixel field (constrained by its Nyquist Limit). Objects at a given distance may have the desired spatial filter applied (convolved). Then, for example, and without limitation, if the distance is doubled as sensed by the rangefinder, half as many display pixels may now be covering the object and the overall spatial frequency content may double. A proportional distance scaling factor (such as a multiplication by 2 in this example) may then be used to adjust the filter in the Fourier domain before calculating the inverse Fourier transform. This scaling factor, which is a direct function of distance, may have an economy of CPU overhead allowing fast calculation in near-real-time. The CPU may execute the computer instructions to selectively create changing filtered scenes from changing content of the tactical scene as that content is received by the optical sensor. The CPU may execute the fixed spatial filter using the changing target distance (and, optionally, a tuned parametric variable) to create altered filtered scene(s) that the user interface displays to the observer.

The optical image sensor may be of a visible, near-infrared (NIR), short-wave infrared (IR), medium-wave IR, or long-wave IR type. The CPU is characterized by an ability to provide real-time or near real-time processing of image data to provide a filtered scene, and in some embodiments, can have a processing speed of not less than 24 frames per second. The CPU may be an Application Specific Integrated Circuit (ASIC) or Field-Programmable Gate Array (FPGA) type. The rangefinder may be of a laser, optical, or ultrasonic distance sensor type. The device may be portable in one or more ways, such as defined by known military standards (e.g., a maximum weight of 11 lbs. with no handle; a maximum weight of 44 lbs. with at least one handle).

BRIEF DESCRIPTION OF THE DRAWINGS

FIG. 10 illustrates comparative diagrams of an exemplary input (an inscribed circle) and an exemplary output (a Fourier spectrum) of an auto-ranging parametric spatial frequency target cuing system according to an embodiment of the present invention.

DETAILED DESCRIPTION OF THE INVENTION

Figure 1:
FIG. 1 is a schematic diagram of an exemplary pre-filtered source image according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 8-14, an auto-ranging parametric spatial filtering (AR-PSF) target cuing device, and associated systems and methods, according to certain embodiments of the present invention, are now described in detail. Throughout this disclosure, the present invention may be referred to as an AR-PSF imaging system, an AR-PSF device, an auto-ranging imaging system, an auto-ranging device, an auto-ranger, a device, a system, and a method. Those skilled in the art will appreciate that this terminology is only illustrative and does not affect the scope of the invention.

Certain embodiments of the invention, as shown and described by the various figures and accompanying text, may overcome the problems in the art described above by actively applying pre-selected (constructed) and/or operator-tuned filters to scenes with reduced clutter while simultaneously enhancing targets of interest to advantageously speed tactical visual search of a complex scene. More specifically, the present invention may actively create and apply different filters to produce a reduced number of fixations and faster (shorter) search times. Because the present invention's actual imagery may apply filters that are scaled for distance, displayed results may advantageously look more natural (increased semantic content) to the viewer.

The present invention relates to automated devices, systems and methods for near real-time analysis of tactical scenes (images) to detect and extract targets that are embedded in clutter and/or camouflaged. The invention may advantageously operate to selectively filter imagery to guide and speed human visual search through the use of continuously-updated sensor-to-target range information in computation of spatial filters.

Figure 8:
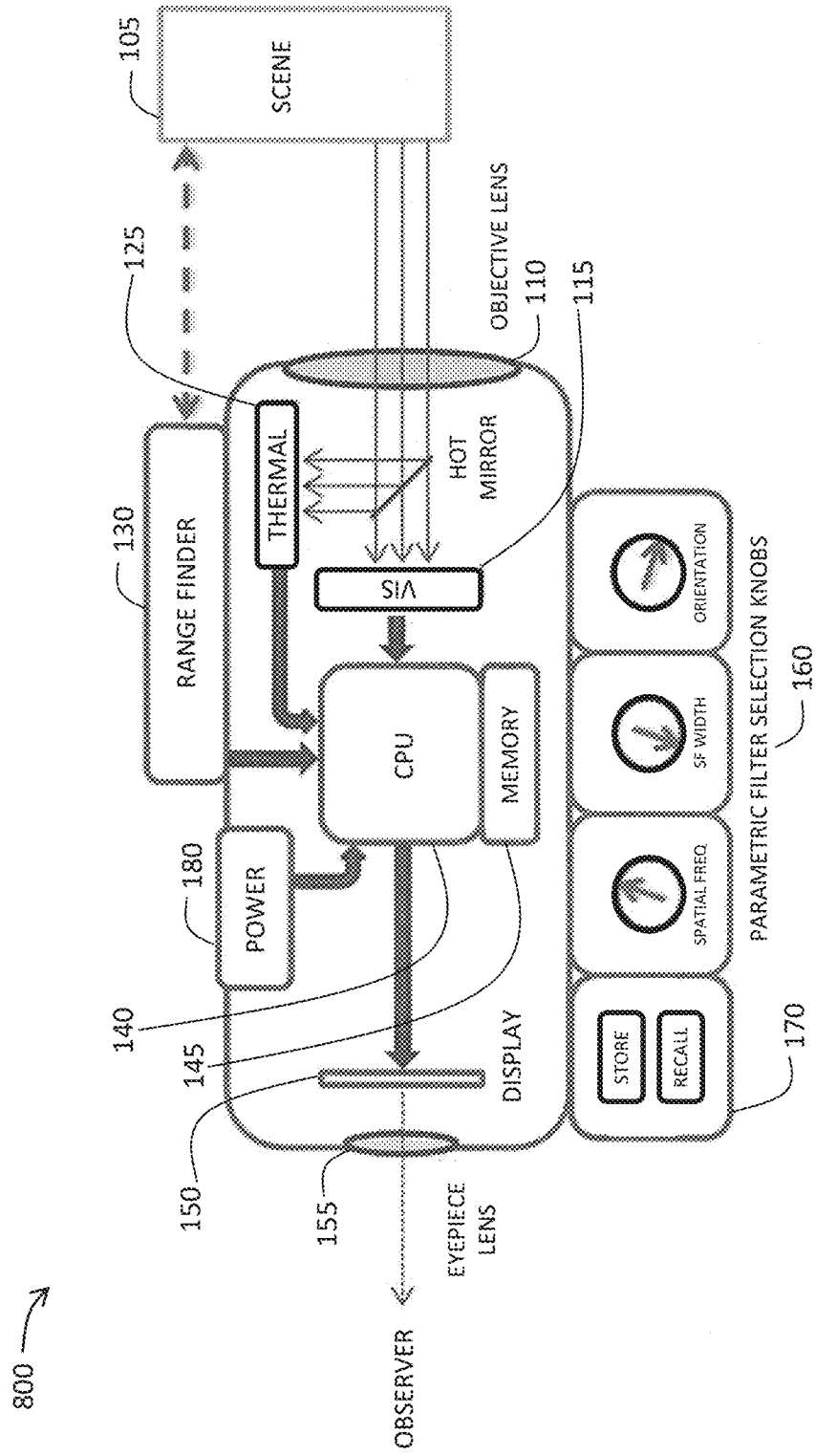
FIG. 8 is a schematic diagram of an exemplary auto-ranging parametric spatial frequency target cuing system according to an embodiment of the present invention.

Referring now to FIG. 8, for example, and without limitation, an embodiment of the present invention may comprise a) a sensor (e.g., visual 115, thermal 125, short-wave) configured to capture image data for a tactical scene 105, b) a rangefinder 130 (e.g., laser) configured to detect sensor-to-target distance, c) spatial frequency filtering automation (e.g., low-pass, high-pass, band-pass, notch, orientation) in the form of instructions configured for execution by a processor 140 to remove non-relevant content from a scene, d) variable controls 160 for tuning spatial frequency, filter shape, and/or orientation content with respect to a scene's spatial content, and e) a human-readable display 150 (for filter algorithm output). Such a target-detection device, system, and/or process may be practically applied in, for example, and without limitation, target cueing, visual search, and surveillance applications.

The following advantages of the present invention are described in more detail hereinbelow:
1) Guides user's eyes in real-time to a desired target within a cluttered tactical scene
2) Adapts a fixed spatial frequency filter to a moving image detection source and/or target
3) Portable implementation for tactical deployment of the image enhancement device
4) Extensible design that can support a variety of complementary components Referring more specifically to FIGS. 8 and 9, the following features of the present invention may be considered important to providing the advantages listed above:

Rangefinder 130 for sensing continuously-changing distances (Block 260) from the portable device 800 (located at a source reference point) to various objects (each located at a respective target reference point) in a tactical scene 105

On-board central processing unit (CPU) 140 and memory 145, both electrically coupled to a power supply 180, for executing selective, two-dimensional (2D) Fourier-domain filters (Block 270)

Parametric filter selection knobs 160 for user-directed tuning of parameters employed in selective spatial frequency filtering (Blocks 292, 294, 296)

User interface 150 for real-time display of continuously-updating filtered scenes containing a target object (Block 280)

Selector switch 170 to store (Block 285) and recall (Block 225) user-defined and/or preconfigured spatial filters for application to future encountered scenes (Block 240)

In one embodiment of the present invention, the device 800 may use spatial frequency (low-pass, bandpass, high-pass, notch, orientation) filtering to declutter tactical scenes to guide and speed visual search in (near) real-time. Because the construction of the spatial filters is, in part, a function of sensor-to-object distance, the rangefinder 130 may be used to dynamically add that information into the computation of each filter employed by the device 800.

It follows that specific filter(s) parameters (e.g., spatial frequency, orientation) may be tuned (as described above) and then fixed (stored 170), even though the object itself (and/or other similar targets) may be moving (or located) closer or further away from the detecting device 800. Without the benefit of the range information, for example, a nearby object's overall spatial content (larger detail) may shift towards the higher frequencies (smaller detail) as the object moves farther away. Consequently, a fixed filter, without ranging information, may become ineffective (detuned). For example, and without limitation, the device, system, and method described herein may be incorporated into an electro-optical (E-O) tracking system, surveillance, an analyst's workstation, and/or a remotely-piloted vehicle display system to aid operators in finding specific, relevant targets.

Figure 9:
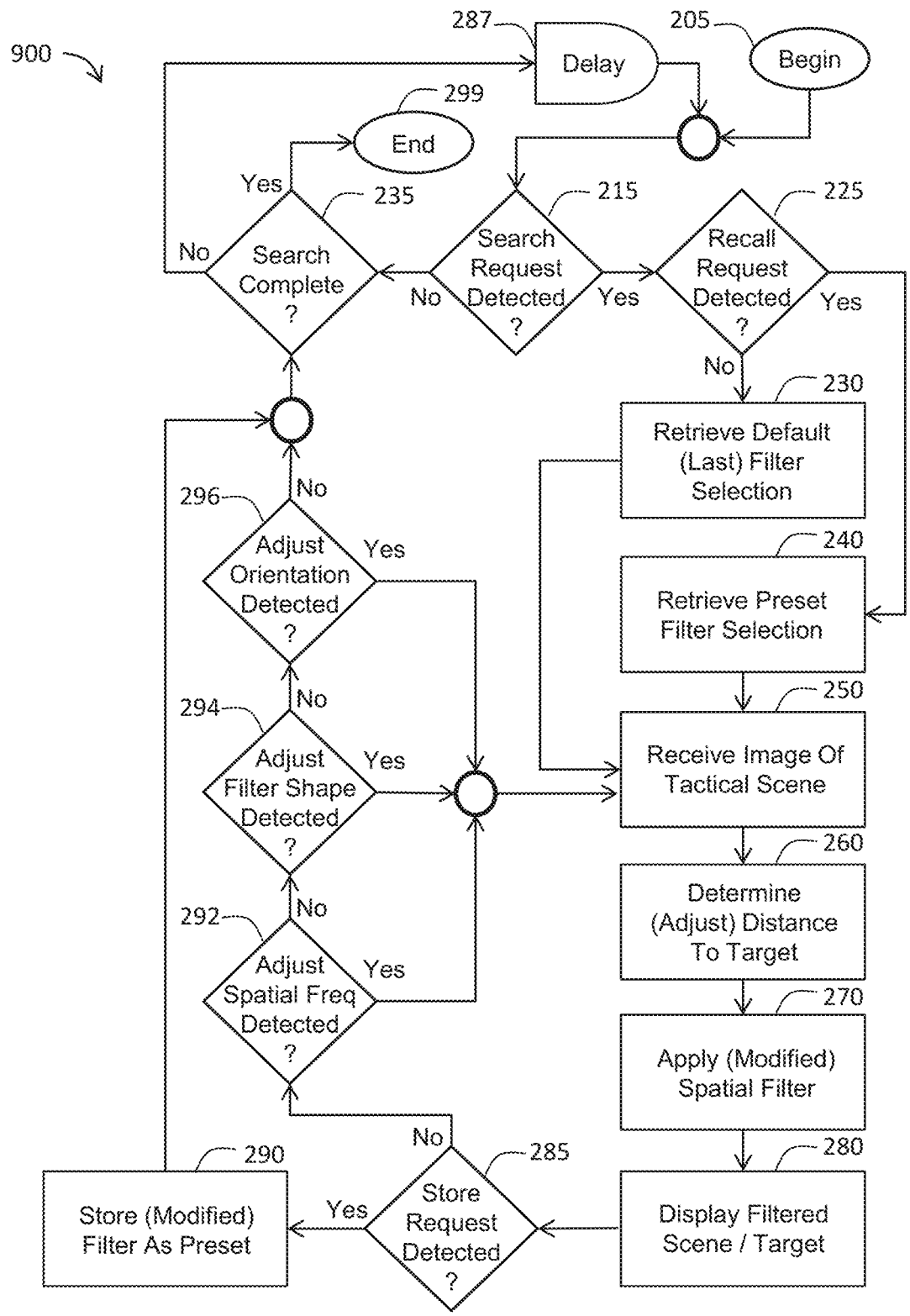
FIG. 9 is a flowchart illustrating various steps in a method of detecting a target in a tactical scene using an auto-ranging parametric spatial frequency target cuing system according to an embodiment of the present invention.

Referring now to FIG. 9, and continuing to refer to FIG. 8, a method aspect 900 of the present invention is now described in more detail. From the beginning at Block 205, computer instructions retrieved from memory 145 and executed by the processor 140 may detect a visual search request (Block 215). For example, and without limitation, the request may be active (e.g., depress 'capture' button, not shown) or passive (e.g., pointing objective lens 110 of the device 800 in the direction of a tactical scene 105 of interest while the device is powered 180). At Block 225, the device may detect a selection of 2D Fourier-domain filters (as described in more detail below) to be applied to declutter an input complex visual scene. Each selected filter may be configured to remove non-relevant spatial content from the input (e.g., sensed) image. For example, and without limitation, control logic computer instructions executed by the processor 140 may retrieve from memory 145 a default filter selection(s) to be applied (Block 230). Also for example, and without limitation, detection of a recall request (e.g., depress recall button 170) may cause control logic computer instructions executed by the processor 140 to retrieve from memory 145 preset filter selection(s) (i.e., pre-optimized filters either configured as "factory" defaults on a particular device 800 and/or custom filters stored during an earlier field application of the device 800) (Block 240).

In certain embodiments of the present invention, more complex filters (signatures), such as a combination of Gabor filters, provided as defaults may be pre-loaded into the device 800 before field use, and/or such signatures may be distributed, downloaded, and implemented via network connection (e.g., Internet). For example, and without limitation, the device 800 may be configured with a USB port (not shown) to allow the loading of default complex filters. Similar network connectivity may facilitate successfully field-derived filters being recovered from one device 800 and distributed to other users, as needed. Default and/or custom filters on a device 800 may be adorned with a unique identifier (e.g., filter name) that may be displayed 150 for browsing and selection.

At Block 250, the processor 140 may receive from one or more sensors 115, 125 a digital image(s) of the tactical scene 105 of interest. At or near the same time as receipt of the input digital image, the processor 140 may operate to determine a distance from the device 800 (at a source reference point) to a potential target(s) (at a target position/reference point) in the tactical scene 105 (Block 260). At Block 270, the processor 140 may operate to apply the selected filter(s) (Blocks 230, 240) to the input digital image (Block 250) using as input to that calculation the determined distance to target (Block 260). The processor 140 may transmit the resultant filtered image display of the filtered scene/target (Block 280) to the display 150 where an observer may view the results, for example, and without limitation, through an eyepiece lens 155. The processor also may embellish the resultant filtered image display with a means to select a specific object in a scene to enhance and store. For example, and without limitation, the processor may apply the selected filter(s) (Blocks 230, 240) to augment the resultant filtered image display with a reticle (not shown), typically circular or rectangular in shape, and positioned to facilitate manual aiming of one or more sensors 115, 125 in the direction of a target object of interest.

Still referring to FIGS. 8 and 9, several controls 160 (knobs) on the device 800 may operate to prompt the processor 140 to execute continuously variable adjustment of (1) spatial frequency (Block 292), (2) filter shape (Block 294), and/or (3) orientation content (Block 296) as applied to the input image. These control knobs 160 may allow tuning of the operable filters while the observer visually monitors the display 150 for a desired target to "pop out." For example, and without limitation, as the observer adjusts the spatial frequency (Block 292), spatial frequency width (Block 294), and orientation filter (Block 296) controls to visually optimize a scene, the observer is interactively creating a custom filter using the device 800. In order to calculate and apply available filters, as well as any filter tuning selections resulting in a custom filter, at the proper scale, ever-changing distances between the device 800 and various objects in a scene 105 may be sensed using the range-finding means 130 (e.g., laser ranging) and may be sent to the built-in computer (i.e., processor 140 and memory 145) for modification of display results.

When the observer is satisfied with a particular display result, at Block 285 the device 800 may detect a request from that observer to store the present filter(s) and tuning(s) as a preset (Block 290) for subsequent retrieval (e.g., depress a store button 170). The filter may then be saved. Real-time display of filters and tuning selected and modified during a given viewing session using the device 800 may be accomplished through any combination of retrieval of preset custom/default filters (Block 230), receipt of changed tactical scenes (Block 250), adjustment of distance to target (Block 260), and modification of filters through tuning (Blocks 270, 292, 294, 296). The device 800 may be configured to loop through the filter modification and display cycle described above until the processor 140 detects a request to terminate a search session (Blocks 235, 287, 299).

As described above, by applying real-time spatial filters to image data associated with a tactical scene, an object of interest may be visually segregated to pop out of the scene more quickly while visual prevalence of unimportant clutter is reduced. A person of skill in the art will immediately recognize that, employing the dynamic nature of filter modification and display cycle described above, different custom filters may be developed, designed, and stored for different tactical objects/targets (e.g., humans, vehicles, tanks, cannon, weapons). In one embodiment of the present invention, such a device, system, and/or method may advantageously augment an automated, staring-array surveillance system with the addition of motion detection (e.g., an enhanced Reichardt detector model). In another embodiment of the present invention, a high conspicuity luminance (magnocellular visual pathway mediated) cue may advantageously be used as a target marker.

As a matter of definition, there are two major visual pathways in the human brain: (1) the Magnocellular Visual Pathway (M-pathway), and (2) the Parvocellular Visual Pathway (P-pathway). The M-pathway is the "where is it" signal. This pathway is very fast and operates in the peripheral visual field. The M-pathway responds to lower spatial frequency luminance variations (contrast), motion, and flicker. (2) The P-pathway is the "what is it" signal. This pathway is much slower than the magno system and operates in the more central visual field. The P-pathway responds to higher spatial resolution (texture) and color. Finding targets embedded in clutter is difficult because such targets are mediated by the slower parvo system. The scene is serially processed. Embodiments of the present invention use spatial and orientation filters to change (selected) fine detail parvo-mediated objects (texture) into magno-mediated objects (luminance contrast), thereby allowing targets to be quickly acquired by the observer's much faster magno stream. Magno-mediated luminance contrast objects help guide, parse, and speed eye search patterns.

The device 800 may integrate multiple subcomponents to achieve its performance. For example, and without limitation, such subcomponents may include an optical imaging system configured to use individual or combinations of visible, near-infrared (NIR), short-wave, medium-wave or long-wave IR digital sensors; a central processing unit (CPU) that may be a standard computing system, a field-programmable gate array (FPGA), or an Application Specific Integrated Circuit (ASIC); a flat, solid-state pixel-based display; and a laser range-finding device to measure the range to the area of interest. The CPU may be powerful enough to perform the necessary calculations in real-time or near-real-time (~24 frames/sec preferred). The sensors may send the digitized video imagery to the CPU which may calculate a 2D Fourier transform for the imagery, apply the selected filter, and then perform an inverse Fourier transform to return the image to the spatial domain so that it may then be displayed to the observer. A selector switch may allow the user/observer to choose different preconfigured spatial filters. The device 800 also may employ continuously variable controls 160 that may allow the user to electronically/algorithmically vary the selected filter's characteristics/relationship of the filtering algorithm with respect to a scene's spatial content. The construction of the filter may be based on selected aspects of current visual science theories for spatial vision.

Filters may be actively (electronically) controlled by operators in real-time (allowing the observer to determine if any improvement is visible). The observer may turn knobs 160 that may vary filter parameters. For example, and without limitation, one knob may control the dominant filter spatial frequency (mean) and the other knob may control the shape (kurtosis/skew). Additional filters may be constructed (e.g., Gabor, Kalman, comb, custom). A third knob may control orientation filter angles. The range of the angle may also be controlled to provide an orientation filter.

The devices, systems, and methods according to certain embodiments of the present invention may construct 2D Fourier-domain filters to declutter an input complex visual scene. For example, and without limitation, FIG. 10 illustrates a Fourier spectrum of a square containing an inscribed circle 1010. The center area is DC and lower spatial frequencies. As one progresses outward in all directions, the spatial frequency increases. To filter any image, first calculate its Fourier spectrum, filter (block) select spatial frequencies (locations), and restore the filtered image by applying the inverse-Fourier transform. Blocking specific areas removes those spatial frequencies when the image is reconstructed 1020 through application of the inverse Fourier transform.

Figure 11:
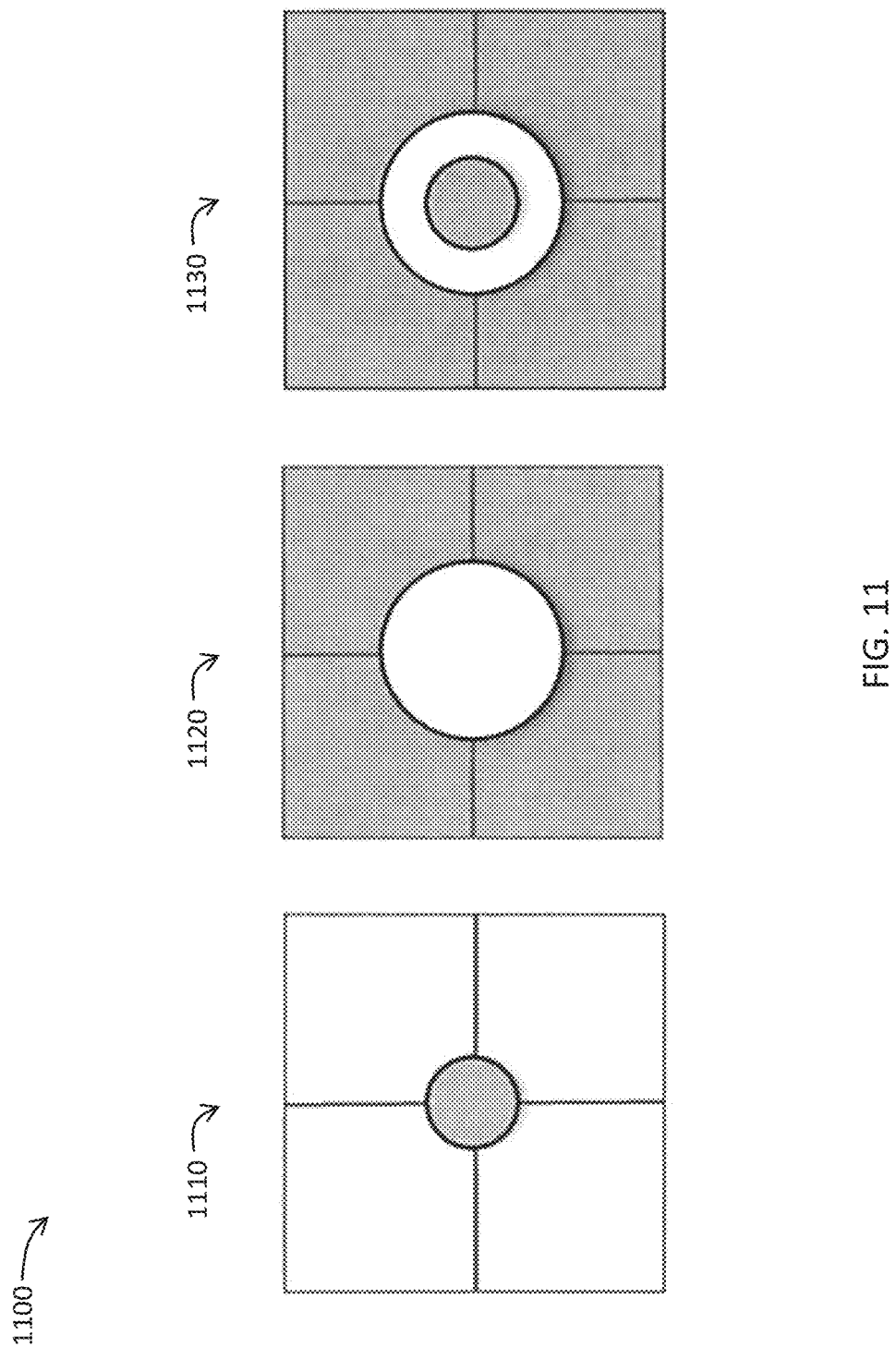
FIG. 11 illustrates comparative diagrams of exemplary Fourier-domain spatial-frequency filters applied by an auto-ranging parametric spatial frequency target cuing system according to an embodiment of the present invention.
Figure 12:
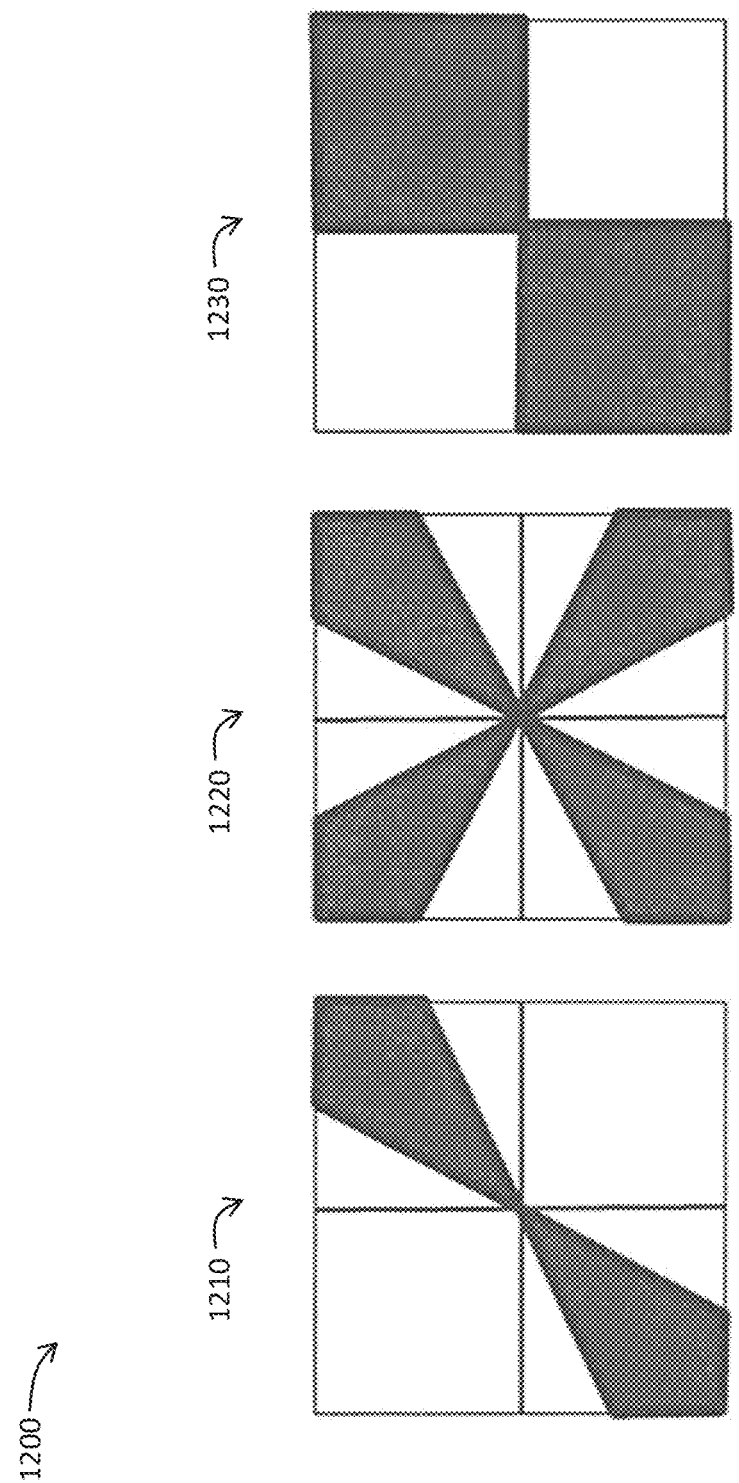
FIG. 12 illustrates comparative diagrams of exemplary Fourier-domain spatial-orientation filters applied by an auto-ranging parametric spatial frequency target cuing system according to an embodiment of the present invention.

FIG. 11 illustrates a comparative schematic 1100 of three examples (left to right) of high-pass 1110 (white passes—dark blocks), low-pass 1120, and band-pass 1130 filters as shown in the Fourier domain that may be constructed using the present system. Also shown is a comparative schematic 1200 of orientation filters 1210, 1220, 1230 that may be constructed and manipulated using certain embodiments of the present invention (see FIG. 12). Numerous and more complex filters can be constructed.

Figure 13:
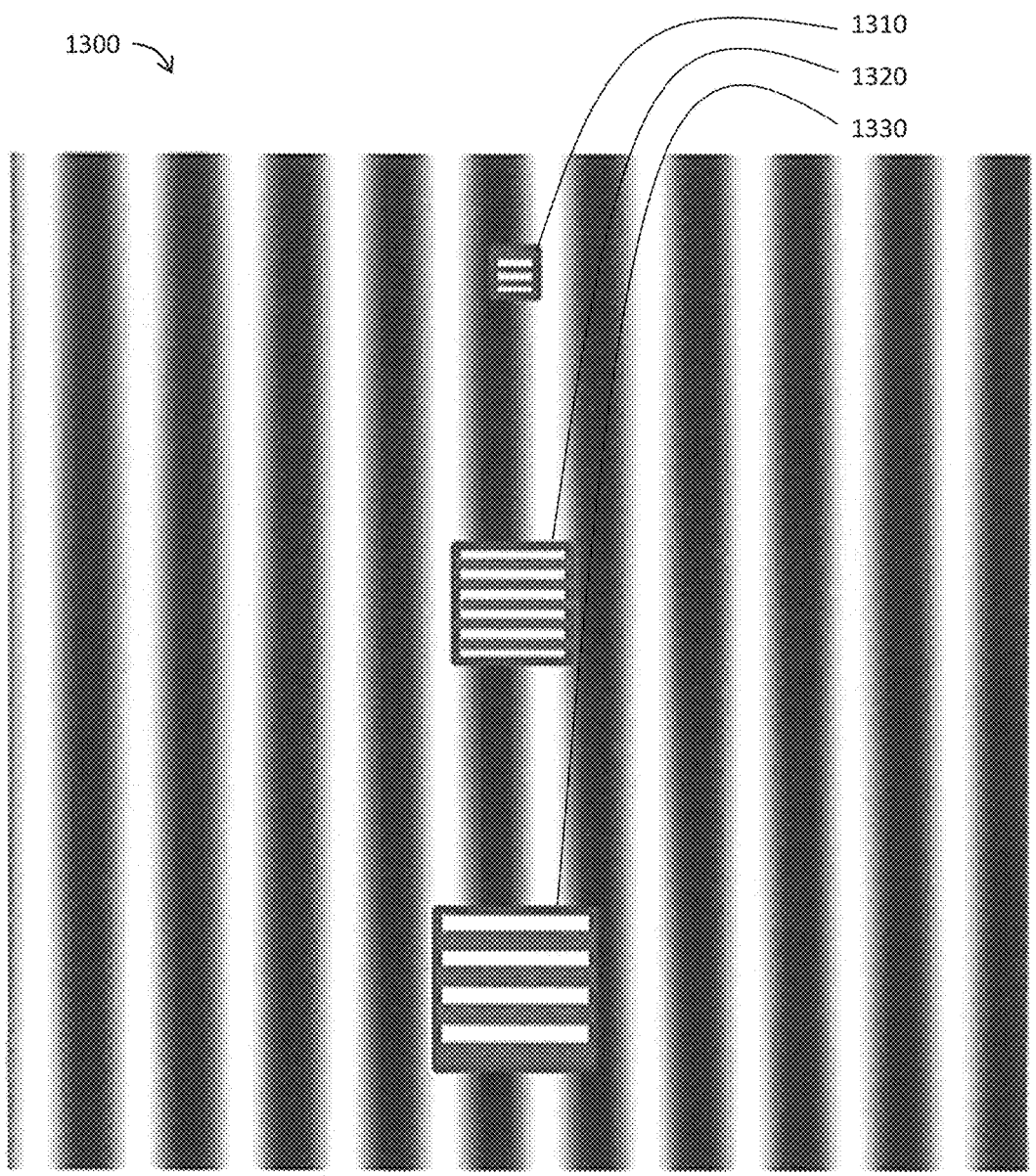
FIG. 13 is a schematic diagram of an exemplary input (high-frequency, horizontally-oriented gratings illustrated upon a low-frequency, sinusoidal grating background) of an auto-ranging parametric spatial frequency target cuing system according to an embodiment of the present invention.
Figure 14:
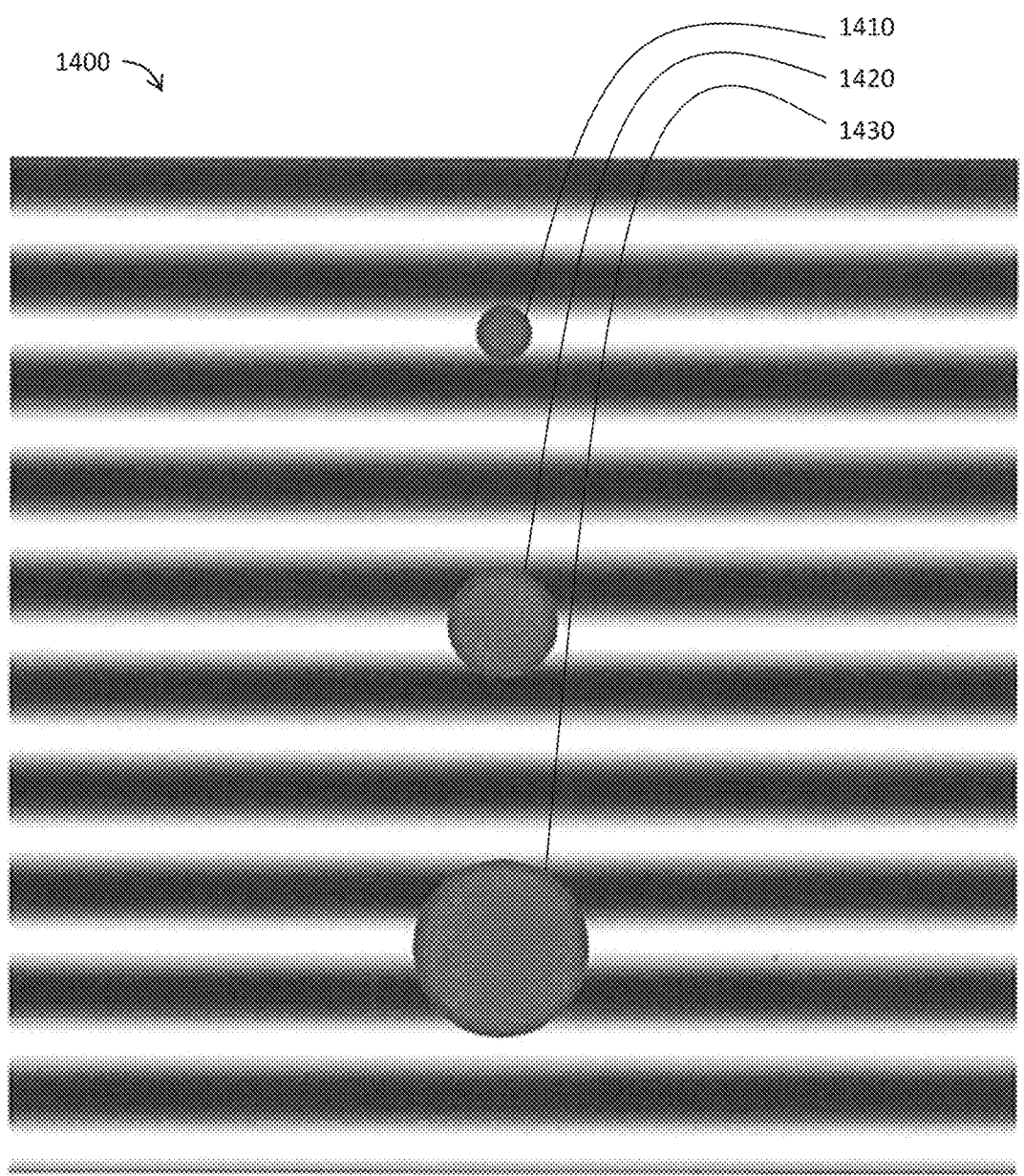
FIG. 14 is a schematic diagram of an exemplary input (fixed-size circles illustrated upon a low-frequency, sinusoidal grating background) of an auto-ranging parametric spatial frequency target cuing system according to an embodiment of the present invention.

FIGS. 13 and 14 are simplified scene simulations to show how such a system could work. FIGS. 13 and 14 each have low-frequency, sinusoidal grating backgrounds. This represents a more or less uniformly cluttered area, like grass. FIG. 13 has three, higher frequency, horizontally oriented gratings 1310, 1320, 1330 that are exactly the same dimensionally but are "positioned" at three different simulated viewing distances; near (large 1330), intermediate (medium 1320), and far (small 1310). That is, for the illustrated example, the horizontally-oriented gratings 1310, 1320, 1330 are used to represent targets present at different simulated distances and embedded in the background clutter, but that need to be detected quickly. In practice, the targets could be most anything (e.g., truck, tank, weapon, building). Aiming the system depicted in FIG. 8, the operator would focus and range find a particular area (near, intermediate, or far). Then, tuning the spatial frequency knobs, a target would pop out when the filters matched a given target's inherent spatial content. The new filter is stored by the device. Then, as the system is focused on closer and further areas of the scene, the "tuned filter" (which is being continuously recalculated using the updated ranging information) will allow other like targets to pop out of the clutter as long as the clutter and target have inherently different spatial content. The range information keeps a given (tuned) target spatial frequency filter constant as the focus distance changes.

Figure 2:
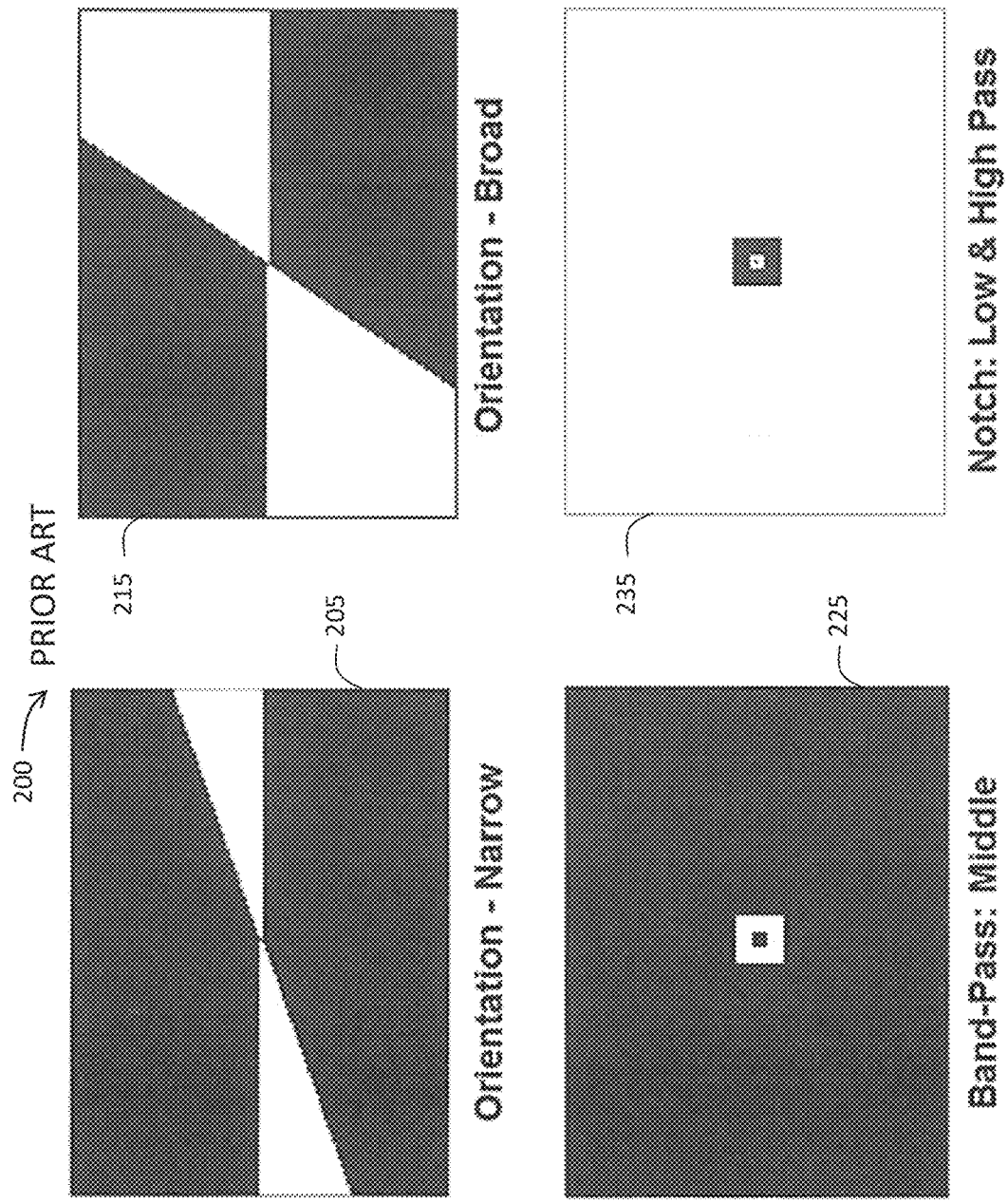
FIG. 2 is a schematic diagram of exemplary Fourier-domain filters according to the prior art.
Figure 3:
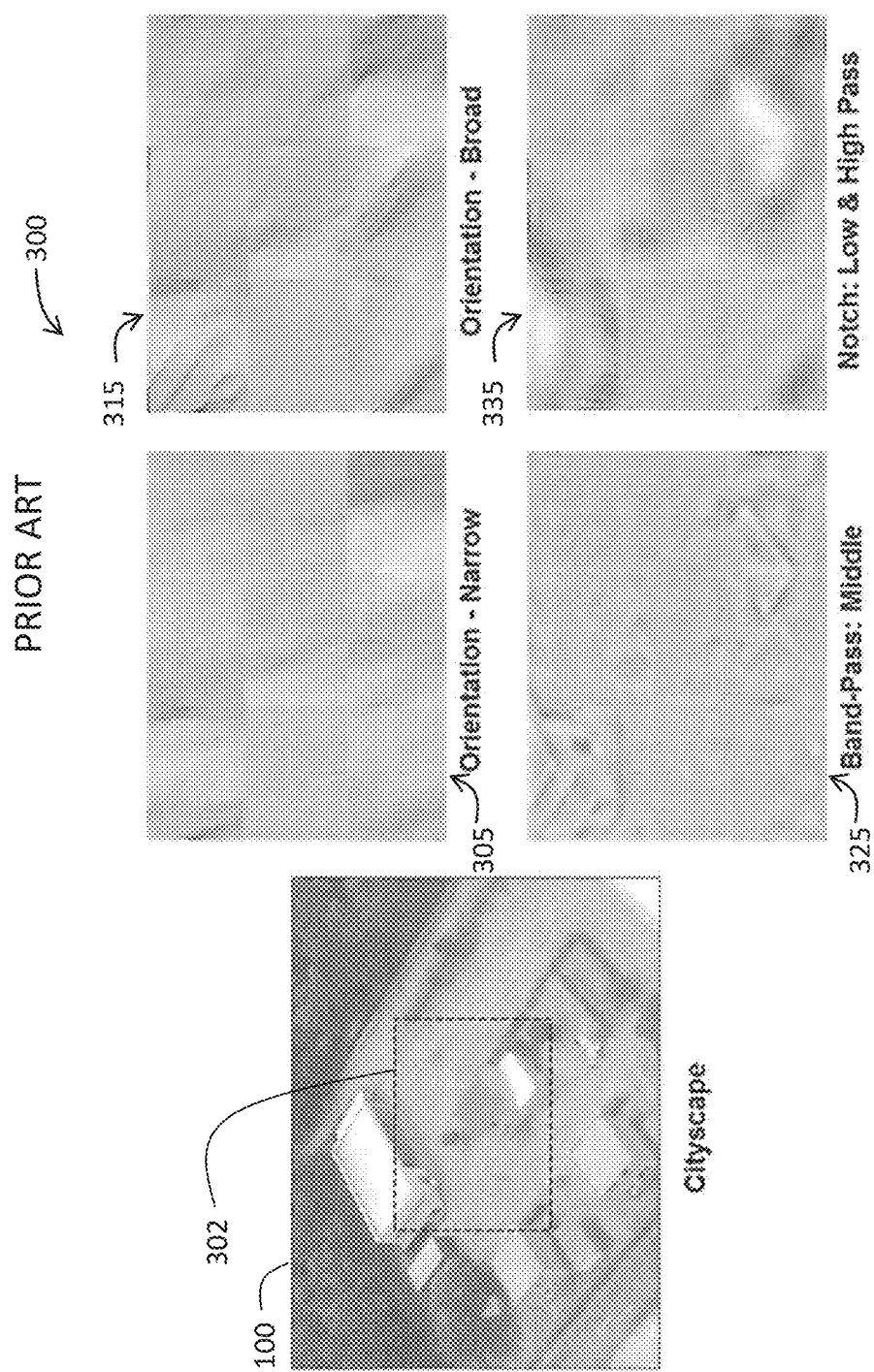
FIG. 3 is a schematic diagram of exemplary patches of the exemplary source image of FIG. 1 convolved with the exemplary Fourier-domain filters of FIG. 2.
Figure 4:
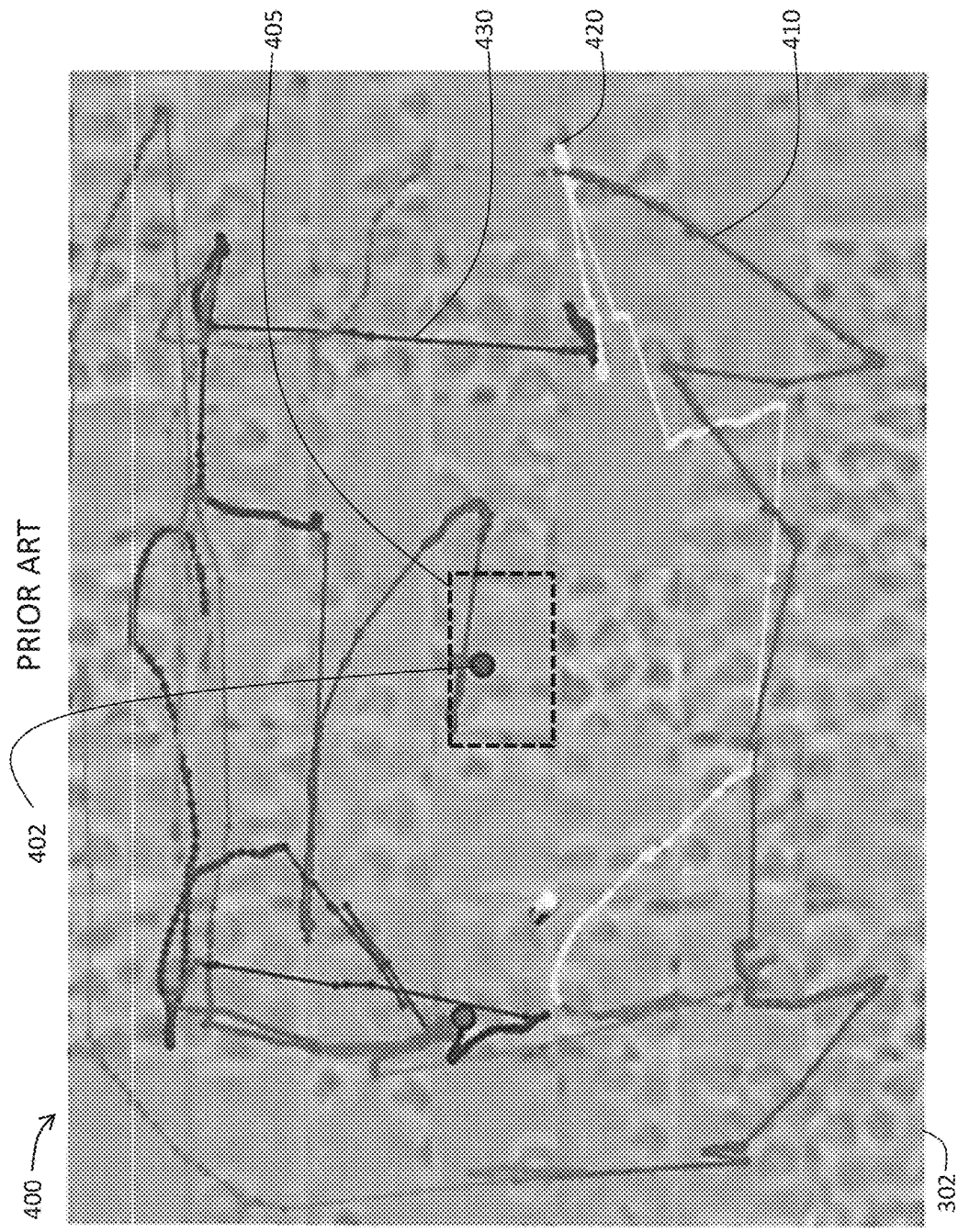
FIG. 4 is a schematic diagram of an exemplary eye-scanning behavior pattern for target cuing within a single-filtered source image according to the prior art.
Figure 5:
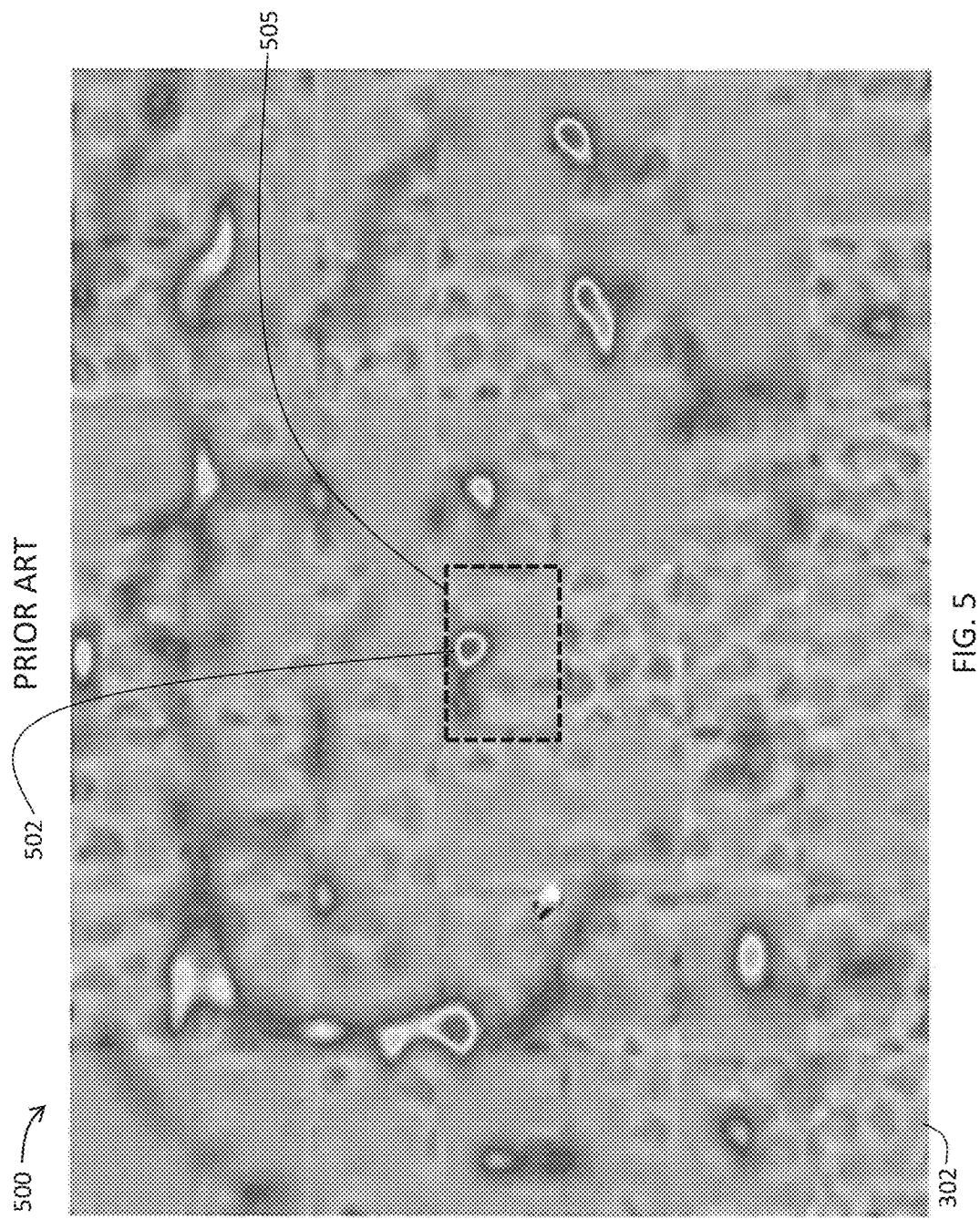
FIG. 5 is a schematic diagram of an exemplary heat map pattern for target cuing within a single-filtered source image according to the prior art.
Figure 6:
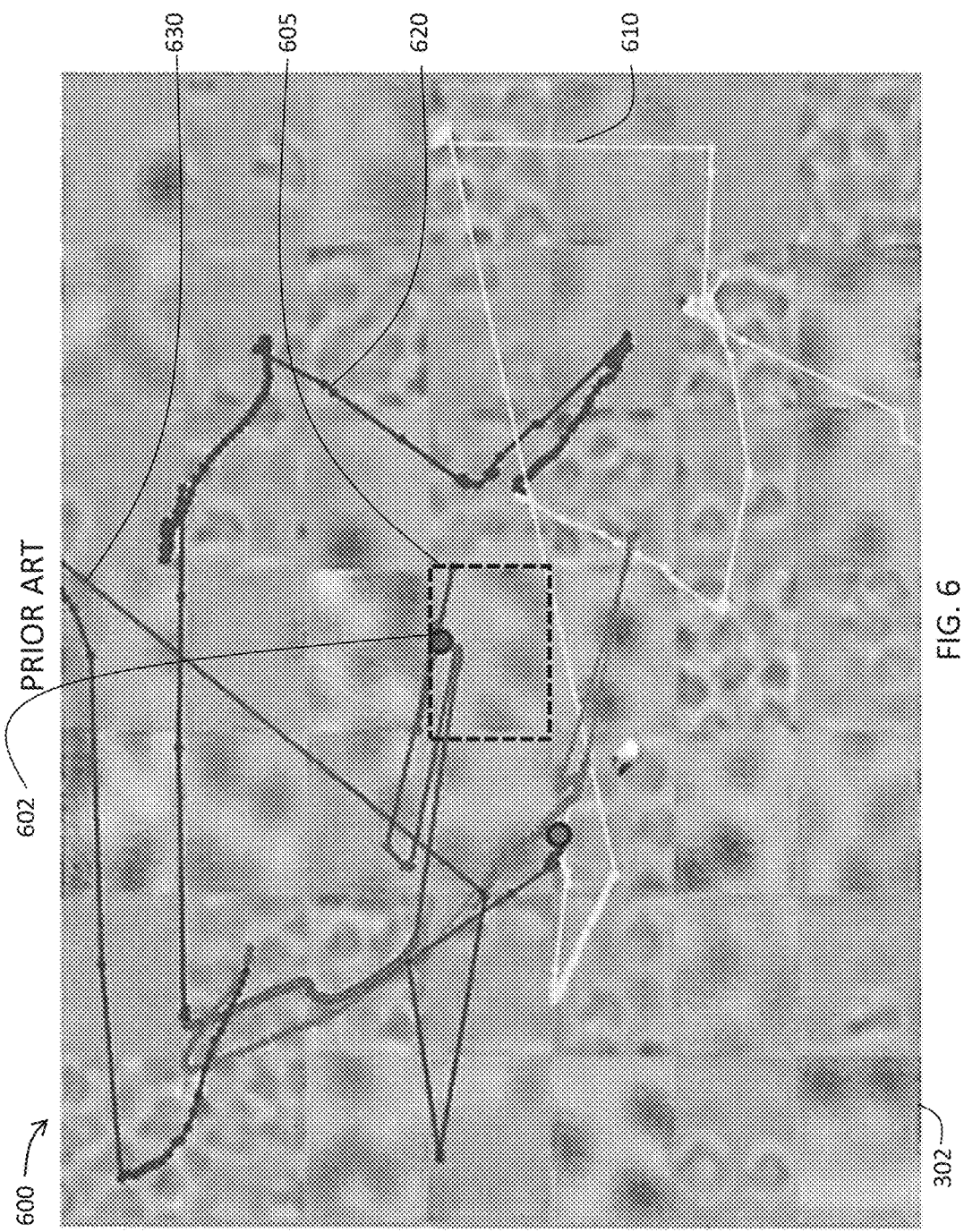
FIG. 6 is a schematic diagram of an exemplary eye-scanning behavior pattern for target cuing within a multi-filtered source image according to the prior art.
Figure 7:
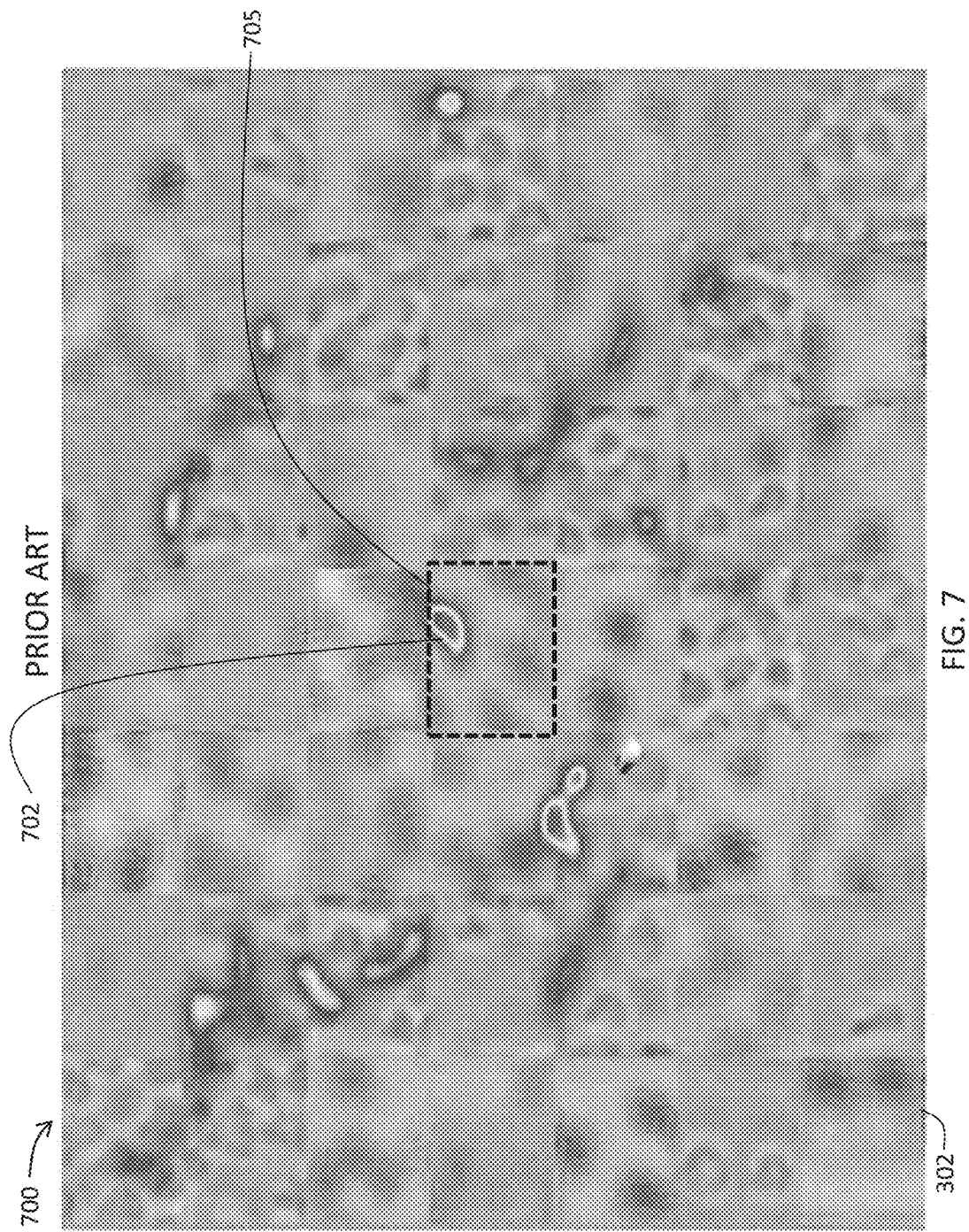
FIG. 7 is a schematic diagram of an exemplary heat map pattern for target cuing within a multi-filtered source image according to the prior art.

FIG. 14 has three, fixed-size circles 1410, 1420, 1430 that are all exactly the same dimensionally but are "positioned" at three different viewing distances: near (large 1430), intermediate (medium 1420), and far (small 1410). These are targets that are embedded in the background clutter but need to be detected quickly. The FIG. 8 device's orientation knob may be adjusted through different angles to speed this detection. Circular targets contain all orientations so they will always be visible. However, the horizontal background has only one predominant orientation, horizontal. As the orientation filter is varied, away from the horizontal, the circular targets will emerge/pop out from the filtered-out clutter/background and be quickly detected. Note: Because an orientation filter applies to all spatial frequencies over a defined angle range, a distance correction is not needed (as is evident in the Fourier-domain orientation filters of FIG. 2).

FIGS. 13 and 14 are simple examples of how continuously variable spatial (low-pass, band-pass, and high pass) filters and orientation filters, coupled with ranging information, can be used to separate targets and cluttered backgrounds. The microprocessor system could also store pre-calculated, more complex filters than those available using asset of tuning knobs, such as the spatial/orientation filters 200 having the "signatures" shown in FIG. 2. For example, and without limitation, a corner filter (i.e., combination of a first filter configured to enhance vertical lines and a second filter configured to enhance horizontal lines) could be constructed and then stored in the device. Man-made structures often have corners whereas naturally occurring objects do not, so this filter may enhance the detection of man-made objects embedded in clutter. The multispectral aspect of the device further enhances the target detection/recognition performance over a wider range of scene types and tactical situations. FIG. 8 shows visible and thermal sensors but a short-wave infrared sensor may also be used. The CPU may be used to perform different types of image enhancement 1210 and fusion algorithms to further maximize the visual performance of the operator.

A person of skill in the art will immediately recognize a large number of enhancement (contrast normalization, denoising, sharpening, colorization) and fusion (averaging, Laplacian, wavelet, PCM) algorithms known in the art may be advantageously applied to construct custom filters using certain embodiments of the present invention. Some algorithms may be more effective than others. The spatial/orientation filtering technique may be applied to either or both (visible and thermal) channels, to pre- or post-enhancement and/or fusion processing, and to whatever combination that yields the best visual performance in terms of situational awareness and target detection/recognition.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for enhancing an image comprising the steps of:
   receiving image data for a tactical scene including a target object;
   determining a first target distance measured from a first reference point to a first position of the target object;
   selectively creating a first filtered scene comprising a first subset of content from the tactical scene and including the target object, by
      receiving a first parametric variable, and
      applying at least one spatial filter using the first target distance and the first parametric variable; and
   displaying the first filtered scene.

2. The method according to claim 1 wherein the at least one spatial filter is of a two-dimensional (2D) Fourier-domain type.

3. The method according to claim 2 wherein the 2D Fourier-domain type is selected from the group consisting of high-pass, low-pass, band-pass, band-stop, and orientation.

4. The method according to claim 1 wherein the first parametric variable is selected from the group consisting of a spatial frequency variable, a filter shape variable, and an orientation variable.

5. The method according to claim 1 further comprising storing a preset filter selection comprising the at least one spatial filter, the first target distance, and the first parametric variable.

6. The method according to claim 1 further comprising:
   determining a second target distance measured from a second reference point to the first position of the target object;
   selectively creating a second filtered scene comprising a second subset of content from the tactical scene and including the target object, by
      applying the at least one spatial filter using the second target distance and the first parametric variable; and
   displaying the second filtered scene.

7. The method according to claim 1 further comprising:
   determining a third target distance measured from the first reference point to a second position of the target object;
   selectively creating a third filtered scene comprising a third subset of content from the tactical scene and including the target object, by
      applying the at least one spatial filter using the third target distance and the first parametric variable; and
   displaying the third filtered scene.

8. The method according to claim 1 further comprising:
   selectively creating a fourth filtered scene comprising a fourth subset of content from the tactical scene and including the target object, by
      receiving a second parametric variable, and
      applying the at least one spatial filter using the first target distance and the second parametric variable; and
   displaying the fourth filtered scene.

9. An image enhancement device comprising:
   an optical image sensor configured to provide image data for a tactical scene including a target object;
   a rangefinder configured to determine a first target distance measured from a first reference point of the device to a first position of the target object;
   a central processing unit (CPU) and a non-transitory computer-readable storage medium accessible through the CPU, wherein the non-transitory computer-readable storage medium comprises a plurality of instructions which, when executed by the CPU, are configured to selectively create a first filtered scene comprising a first subset of content from the tactical scene and including the target object, by
      receiving from a first filter selection control a first parametric variable, and
      applying at least one spatial filter using the first target distance and the first parametric variable; and
   a user interface configured to display the first filtered scene.

10. The image enhancement device according to claim 9 wherein the at least one spatial filter is of a two-dimensional (2D) Fourier-domain type.

11. The image enhancement device according to claim 10 wherein the 2D Fourier-domain type is selected from the group consisting of high-pass, low-pass, band-pass, band-stop, and orientation.

12. The image enhancement device according to claim 9 wherein the first parametric variable is selected from the group consisting of a spatial frequency variable, a filter shape variable, and an orientation variable.

13. The image enhancement device according to claim 9 wherein the plurality of instructions is further configured to store a preset filter selection comprising the at least one spatial filter, the first target distance, and the first parametric variable.

14. The image enhancement device according to claim 9 wherein the rangefinder is further configured to determine a second target distance measured from a second reference point to the first position of the target object;
   wherein the plurality of instructions is further configured to selectively create a second filtered scene comprising a second subset of content detected by the optical image sensor for the tactical scene and including the target object, by applying the at least one spatial filter using the second target distance and the first parametric variable; and
   wherein the user interface is further configured to display the second filtered scene.

15. The image enhancement device according to claim 9 wherein the rangefinder is further configured to determine a third target distance measured from the first reference point to a second position of the target object;
   wherein the plurality of instructions is further configured to selectively create a third filtered scene comprising a third subset of content detected by the optical sensor for the tactical scene and including the target object, by applying the at least one spatial filter using the third target distance and the first parametric variable; and
   wherein the user interface is further configured to display the third filtered scene.

16. The image enhancement device according to claim 9 wherein the plurality of instructions is further configured to selectively create a fourth filtered scene comprising a fourth subset of content detected by the optical sensor for the tactical scene and including the target object, by receiving from a second filter selection control a second parametric variable, and applying the at least one spatial filter using the first target distance and the second parametric variable; and wherein the user interface is further configured to display the fourth filtered scene.

17. The image enhancement device according to claim 9 wherein the optical image sensor is of a sensor type selected from the group consisting of visible, near-infrared (NIR), short-wave infrared (IR), medium-wave IR, and long-wave IR.

18. The image enhancement device according to claim 9 wherein the CPU is of a processor type selected from the group consisting of Application Specific Integrated Circuit (ASIC) and Field-Programmable Gate Array (FPGA), and is characterized by a processing speed of not less than 24 frames per second.

19. The image enhancement device according to claim 9 wherein the rangefinder is of a distance sensor type selected from the group consisting of laser, optical, and ultrasonic.

20. An image enhancement system comprising:

an optical image sensor configured to create image data representative of a tactical scene including a target object;

a rangefinder configured to create distance data representative of the tactical scene including the target object, wherein the distance data include a first target distance measured from a first reference point of the rangefinder to a first position of the target object;

a central processing unit (CPU) and a non-transitory computer-readable storage medium accessible through the CPU, wherein the non-transitory computer-readable storage medium comprises a plurality of instructions which, when executed by the CPU, are configured to selectively create a first filtered scene by
  receiving from a first filter selection control a first parametric variable, and
  applying at least one spatial filter to a subset of the image data using the first target distance and the first parametric variable; and a user interface configured to display the first filtered scene.

* * * * *